United States Patent
Saha et al.

(10) Patent No.: US 11,275,571 B2
(45) Date of Patent: Mar. 15, 2022

(54) UNIFIED INSTALLER

(71) Applicant: SAP SE, Walldorf (DE)

(72) Inventors: Rajib Saha, Siliguri (IN); Sivakanth Jayaram, Kerala (IN); Sai Hari Prasad Pabbathi, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/714,362

(22) Filed: Dec. 13, 2019

(65) Prior Publication Data

US 2021/0182042 A1 Jun. 17, 2021

(51) Int. Cl.
| | |
|---|---|
| G06F 9/44 | (2018.01) |
| G06F 9/445 | (2018.01) |
| G06F 8/61 | (2018.01) |
| G06F 7/14 | (2006.01) |

(52) U.S. Cl.
CPC . *G06F 8/61* (2013.01); *G06F 7/14* (2013.01)

(58) Field of Classification Search
CPC ..... G06F 8/61; G06F 7/14; G06F 8/60; G06F 8/65; G06F 7/16; G06F 7/20; G06F 7/22; G06F 7/24; G06F 7/26; G06F 7/32; G06F 7/36

See application file for complete search history.

(56) References Cited

U.S. PATENT DOCUMENTS

| | | |
|---|---|---|
| 5,842,024 A | 11/1998 | Choye et al. |
| 6,075,943 A | 6/2000 | Feinman |
| 8,365,164 B1 | 1/2013 | Morgenstern |

(Continued)

FOREIGN PATENT DOCUMENTS

| | | | | |
|---|---|---|---|---|
| CN | 108958742 A | * | 12/2018 | |
| EP | 1492002 A2 | | 12/2004 | |
| WO | WO-2016120885 A1 | * | 8/2016 | ............... G06F 8/61 |

OTHER PUBLICATIONS

Mika V. Mantyla, Software Deployment Activities and Challenges—A Case Study of Four Software Product Companies, 2011, pp. 131-139. https://ieeexplore.ieee.org/stamp/stamp.jsp?tp=&arnumber=5741269 (Year: 2011).*

(Continued)

*Primary Examiner* — Mongbao Nguyen
(74) *Attorney, Agent, or Firm* — Fountainhead Law Group P.C (57) ABSTRACT

A unified installer reduces system down time attributable to product installation, by eliminating redundant activities. An engine receives a request to install a first software product and a second software product. The engine references respective seed files of the first and second products to confirm their membership in a same family, and also to confirm compatibility between the product versions. The engine first performs a logical merger to create a merged seed file identifying components (e.g., deployment units, prerequisites, properties, features) that are duplicated between the products. Next, the engine performs a second, physical merger of the products to create a unified installer which avoids redundant components. The unified installer is passed by the engine to the installation procedure, which installs the components only once, thereby promoting efficiency and reducing system down time incurred by product installation.

11 Claims, 10 Drawing Sheets

(56) References Cited

U.S. PATENT DOCUMENTS

| | | | | |
|---|---|---|---|---|
| 8,584,116 | B2* | 11/2013 | Shima | G06F 8/61 717/174 |
| 10,001,982 | B1* | 6/2018 | Kozlowski | G06F 8/61 |
| 2006/0048140 | A1 | 3/2006 | Boctor et al. | |
| 2007/0277170 | A1* | 11/2007 | Kapoor | G06F 8/61 717/174 |
| 2009/0328024 | A1* | 12/2009 | Li | G06F 11/1435 717/169 |
| 2013/0145349 | A1* | 6/2013 | Basak | G06F 11/323 717/121 |
| 2014/0181800 | A1* | 6/2014 | Johansson | G06F 8/656 717/172 |
| 2015/0082298 | A1* | 3/2015 | Wang | G06F 8/60 717/174 |
| 2015/0186125 | A1* | 7/2015 | Avery | G06F 9/44578 717/174 |
| 2015/0363181 | A1* | 12/2015 | Alberti | G06F 8/61 717/177 |
| 2018/0018191 | A1* | 1/2018 | Bradshaw | G06F 9/45558 |
| 2019/0065168 | A1* | 2/2019 | Nakamura | G06F 8/65 |
| 2019/0243905 | A1* | 8/2019 | Kannan | G06F 16/116 |
| 2019/0324733 | A1* | 10/2019 | Lubyanskyy | G06F 8/76 |
| 2019/0325043 | A1* | 10/2019 | Liao | G06F 16/178 |
| 2021/0099590 | A1* | 4/2021 | Zhang | H04L 41/0859 |

OTHER PUBLICATIONS

Suresh, "Zero Downtime, Instant Deployment and Rollback", Cloud in Engineering, Nov. 21, 2013, 10 pages.

Anonymous "Using Blue-Green Deployment To Reduce Downtime and Risk", https://docs.cloudfoundry.org/devguide/deploy-apps/blue-green.html, 3 pages.

Extended European Search Report for EP Appl # 20203031, dated Mar. 19, 2021, 12 pages.

* cited by examiner

```xml
<feature id="installer.runtime" description="ffeature.installer.runtime.description" display="hidden" name=
    <instance id="installer.runtime">
        <deploymentUnitRef ref="setup.core-4.0-core"/>
        <deploymentUnitRef ref="product.shared.aurora-4.0-core"/>
        <deploymentUnitRef ref="platform.services.cms.cpp.dbcheck-4.0-core" defaultObjectModel="64"/>
        <deploymentUnitRef ref="product.businessobjects64.langpackproperty-4.0-core"/>
        <deploymentUnitRef ref="product.businessobjects64.productfamilyid-4.0-core"/>
        <deploymentUnitRef ref="platform.sdk.boe.java.deployment.management-4.0-core"/>
        <deploymentUnitRef ref="platform.services.masterservers.deploymentfile.management-4.0-core"/>
        <deploymentUnitRef ref="platform.services.masterservers.deploymentfile.props-4.0-core"/>
        <deploymentUnitRef ref="product.businessobjects64.arp-4.0-core" defaultObjectModel="32"/>
        <deploymentUnitRef ref="product.businessobjects64.actions-4.0-core" defaultObjectModel="64"/>
        <deploymentUnitRef ref="product.shared.installdiverse.reg-4.0-core"/>
        <deploymentUnitRef ref="shared.tp.aurora.installmedia.jre-4.0-core" defaultObjectModel="64"/>
        <deploymentUnitRef ref="shared.tp.aurora.microsoft.vcredist12-4.0-core" defaultObjectModel="64"/>
        <deploymentUnitRef ref="shared.tp.aurora.microsoft.vcredist12-4.0-core" defaultObjectModel="32"/>
    </instance>
</feature>
```

FIG. 4

```
<feature id="installer.runtime" description="" display="hidden" name="" defaultState="install">
  <instance id="installer.runtime">
    <deploymentUnitRef ref="setup.core-4.0-core"/>
    <deploymentUnitRef ref="platform.services.smartservers.deploymentfile.management-4.0-core"/>
    <deploymentUnitRef ref="platform.services.smartservers.deploymentfile.props-4.0-core"/>
    <deploymentUnitRef ref="product.explorer.actions-4.0-core" defaultObjectModel="32"/>
    <deploymentUnitRef ref="product.explorer.asp-4.0-core" defaultObjectModel="32"/>
    <deploymentUnitRef ref="product.shared.installverse.reg-4.0-core"/>
    <deploymentUnitRef ref="product.explorer.langpackproperty-4.0-core"/>
    <deploymentUnitRef ref="product.explorer.productfamilyid-4.0-core"/>
    <deploymentUnitRef ref="shared.tp.aurora.microsoft.vcredisti2-4.0-core" defaultObjectModel="64"/>
    <deploymentUnitRef ref="shared.tp.aurora.microsoft.vcredisti2-4.0-core" defaultObjectModel="32"/>
  </instance>
</feature>
```

FIG. 5

```xml
<instance id="installer.runtime" description="ifeature.installer.runtime.description" display="hidden" name="">
  <deploymentUnitRef ref="installer.runtime"/>
  <deploymentUnitRef ref="setup.core-4.0-core"/>
  <deploymentUnitRef ref="product.shared.aurora-4.0-core"/>
  <deploymentUnitRef ref="platform.services.cms.cpp.dbcheck-4.0-core" defaultObjectModel="64"/>
  <deploymentUnitRef ref="platform.services.businessobjects64.langpackproperty-4.0-core"/>
  <deploymentUnitRef ref="product.businessobjects64.productfamilyid-4.0-core"/>
  <deploymentUnitRef ref="platform.sdk.boe.java.deploymentfile.management-4.0-core" defaultObjectModel="64"/>
  <deploymentUnitRef ref="platform.services.smartservers.deploymentfile.management-4.0-core"/>
  <deploymentUnitRef ref="platform.services.smartservers.deploymentfile.props-4.0-core"/>
  <deploymentUnitRef ref="product.explorer.actions-4.0-core" defaultObjectModel="32"/>
  <deploymentUnitRef ref="product.explorer.arp-4.0-core" defaultObjectModel="32"/>
  <deploymentUnitRef ref="product.businessobjects64.arp-4.0-core" defaultObjectModel="64"/>
  <deploymentUnitRef ref="product.businessobjects64.actions-4.0-core" defaultObjectModel="64"/>
  <deploymentUnitRef ref="product.shared.installiverse.reg-4.0-core"/>
  <deploymentUnitRef ref="product.explorer.langpackproperty-4.0-core"/>
  <deploymentUnitRef ref="product.explorer.productfamilyid-4.0-core"/>
  <deploymentUnitRef ref="shared.tp.aurora.installmedia.jre-4.0-core" defaultObjectModel="64"/>
  <deploymentUnitRef ref="shared.tp.aurora.microsoft.vcredist12-4.0-core" defaultObjectModel="64"/>
  <deploymentUnitRef ref="shared.tp.aurora.microsoft.vcredist12-4.0-core" defaultObjectModel="32"/>
</instance>
```

| Serial No. | Scenario | Installation time taken(mins) |
|---|---|---|
| 1 | Product "X" SP update | 67 |
| 2 | Product "Y" SP update | 35 |
| 3 | Product "X" + "Y" individual SP Update | 67 + 35 = 102 |
| 4 | Unified Installer (Product "X" + "Y" SP Update) | 70 |

FIG. 8

| Serial No. | Scenario | Installation time taken(mins) |
|---|---|---|
| 1 | Product "X" SP update | 67 |
| 2 | Product "Y" SP update | 35 |
| 3 | Product "Z" SP update | 35 |
| 4 | Product "X" + "Y" + "Z" individual SP Update | 67 + 35 + 35 = 137 |
| 5 | Unified Installer ("X" + "Y" + "Z" SP Update) | 77 |

FIG. 9

UNIFIED INSTALLER

BACKGROUND

Unless otherwise indicated herein, the approaches described in this section are not prior art to the claims in this application and are not admitted to be prior art by inclusion in this section.

Software packages offer complex features that periodically need upgrading. Accordingly, the software vendor releases patches, service packs, and major releases, in order to address these demands.

In-order to upgrade the existing software solution to a newer version, customers may bring offline their live system. The delta time, when the system is not accessible, is called downtime.

The length of system downtime to accommodate updates, poses a challenge to the software industry. The business of customer can be directly and indirectly affected at the time of software update, and accordingly customers seek software with reduced downtime.

SUMMARY

A unified installer reduces system down time attributable to product installation, by eliminating redundant activities. An engine receives a request to install a first software product and a second software product. The engine references respective seed files of the first and second products to confirm their membership in a same family, and also to confirm compatibility between the product versions. The engine first performs a logical merger to create a merged seed file identifying components (e.g., deployment units, prerequisites, properties, features) that are duplicated between the products. Next, the engine performs a second, physical merger of the products to create a unified installer which avoids redundant components. The unified installer is passed by the engine to the installation procedure, which installs the components only once, thereby promoting efficiency and reducing system down time incurred by product installation.

The following detailed description and accompanying drawings provide a better understanding of the nature and advantages of various embodiments.

DETAILED DESCRIPTION

Described herein are methods and apparatuses implementing runtime compilation of bytecodes. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
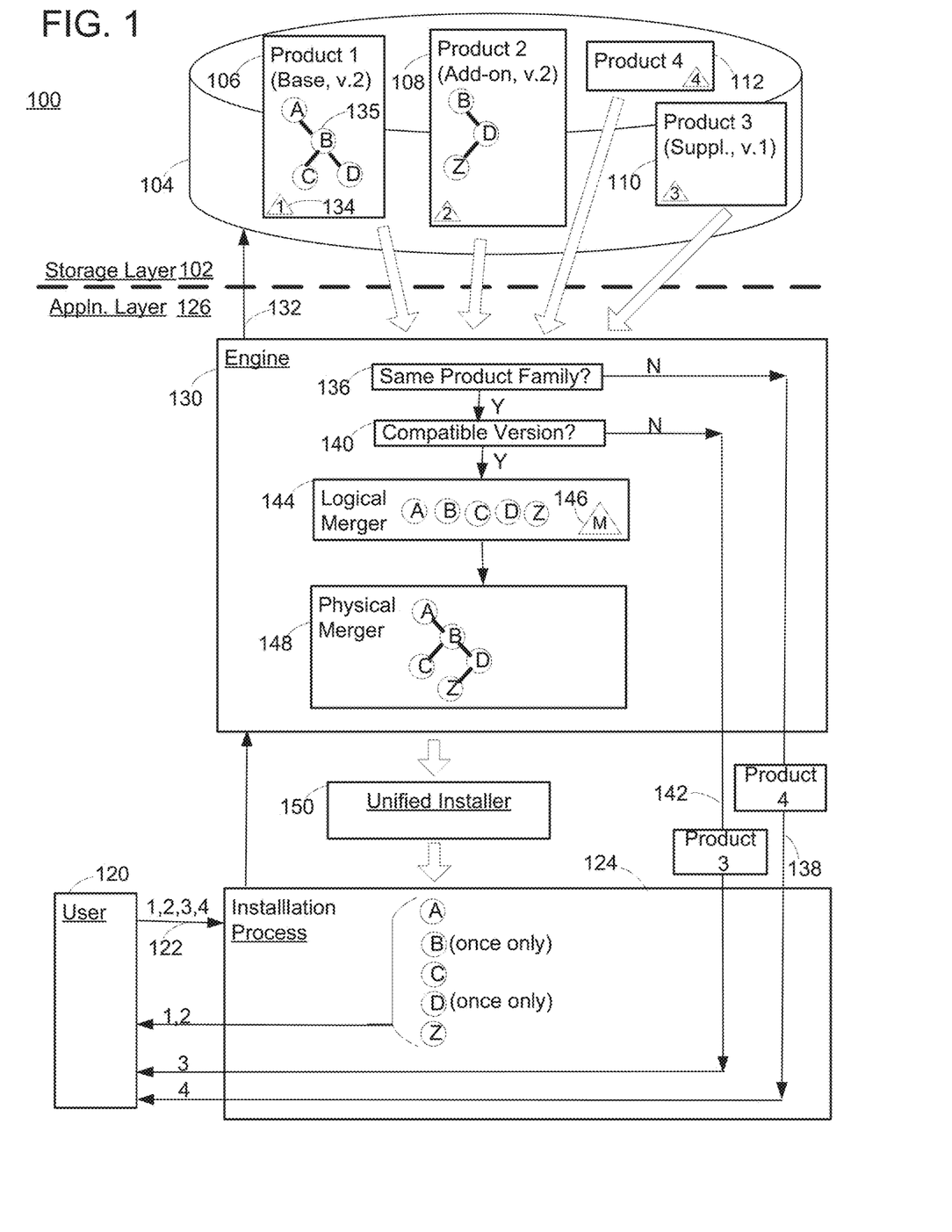
FIG. 1 shows a simplified diagram of a system according to an embodiment.

FIG. 1 shows a simplified view of an example system that is configured to implement product installation according to an embodiment. Specifically, system 100 comprises a storage layer 102 comprising a database 104 with a plurality of products.

In particular, product 1 106 represents a base product of version 2.0, and product 2 108 represents an add-on to the base product. Product 3 110 belongs to a same product family as products 1 and 2, but in a version (v. 1.0) incompatible with version 2.0. Product 4 112 does not belong to the same product family as products 1, 2, and 3.

A user 120 seeks to install the products 1, 2, 3, and 4 in an efficient manner resulting in as little system downtime as possible. Accordingly, the user issues a request 122 to installation process 124 that is located in an application layer 126.

The installation process then forwards the request to an engine 130. The engine receives the request, and in response sends a query 132 to the database to identify the products stored therein.

Specifically, each of the products includes a respective seed file 134. Those seed files identify one or more various attributes of the products, including but not limited to:
family;
version;
Deployment Units (DUs) 135;
prerequisites;
properties;
functions.

Based upon database information, the engine compares 136 the product families of the products to determine membership in a same family. Here, this comparison reveals product 4 to belong to a family different from products 1, 2, and 3. Accordingly, the engine passes 138 the product 4 to the installation process for direct installation.

The engine then compares 140 the versions of the products to determine compatibility of versions. Here, this comparison reveals product 3 to be of a version incompatible with products 1 and 2. Accordingly, the engine passes 142 the product 3 to the installation process for direct installation.

Having determined products 1 and 2 to be of a same family and of compatible versions, the engine next performs a logical merger 144. Specifically, this logical merger creates a merged seed file 146 from the seed files of the products 1 and 2. This logical merger identifies redundant components between the two products.

Next, the engine performs a physical merger 148. That physical merger considers a hierarchical structure of product components such as DUs, in order to create a unified installer 150 that avoids duplicate components.

The engine then communicates the unified installer to the installation process. Rather than separately installing the products 1 and 2, the installation process executes the unified installer. This installation avoids installation delays attributable to redundancies between the products 1 and 2, with no change in function or availability of those products to the end user.

Figure 1A:
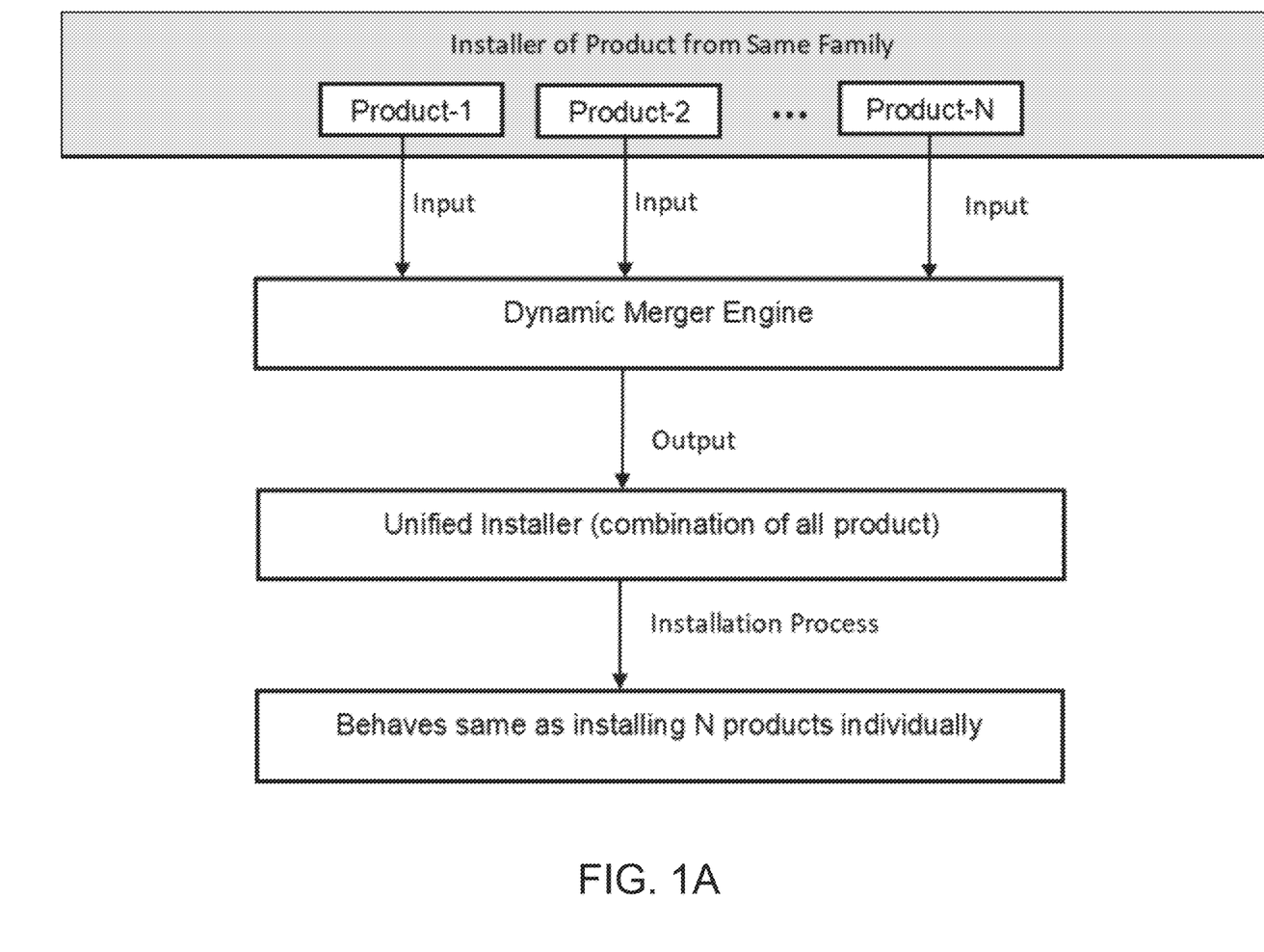
FIG. 1A shows an overview of the flow of information in the system of FIG. 1.

FIG. 1A shows an overview of the flow of information according to an embodiment. FIG. 1A shows that the installation process referencing the unified installer according to embodiments, accomplishes the same result as separately installing each of the products of the same family, but with greater efficiency.

As indicated in FIG. 1A, embodiments receive the installer path of the needed products as input. The engine will analyze the input products to confirm that they are of compatible versions.

If all the input products are of the same product family and are compatible versions, the engine will intelligently, logically, and dynamically merge the necessary files and deployment units of all the products.

Embodiments will generate a unified installer, which is combination of the products. The Unified Installer will have one setup.exe or setup.sh.

With triggering this setup.exe or setup.sh, installation will proceed as with a single product. This single installation will internally install all of the selected products.

After installation completes, all the individual products entry will be present in the machine, and all the products will behave independently. So, features of all the N products will be available. It is noted that all separate entries of N product would also be present in the Add Remove Program (ARP) as well.

Figure 2:
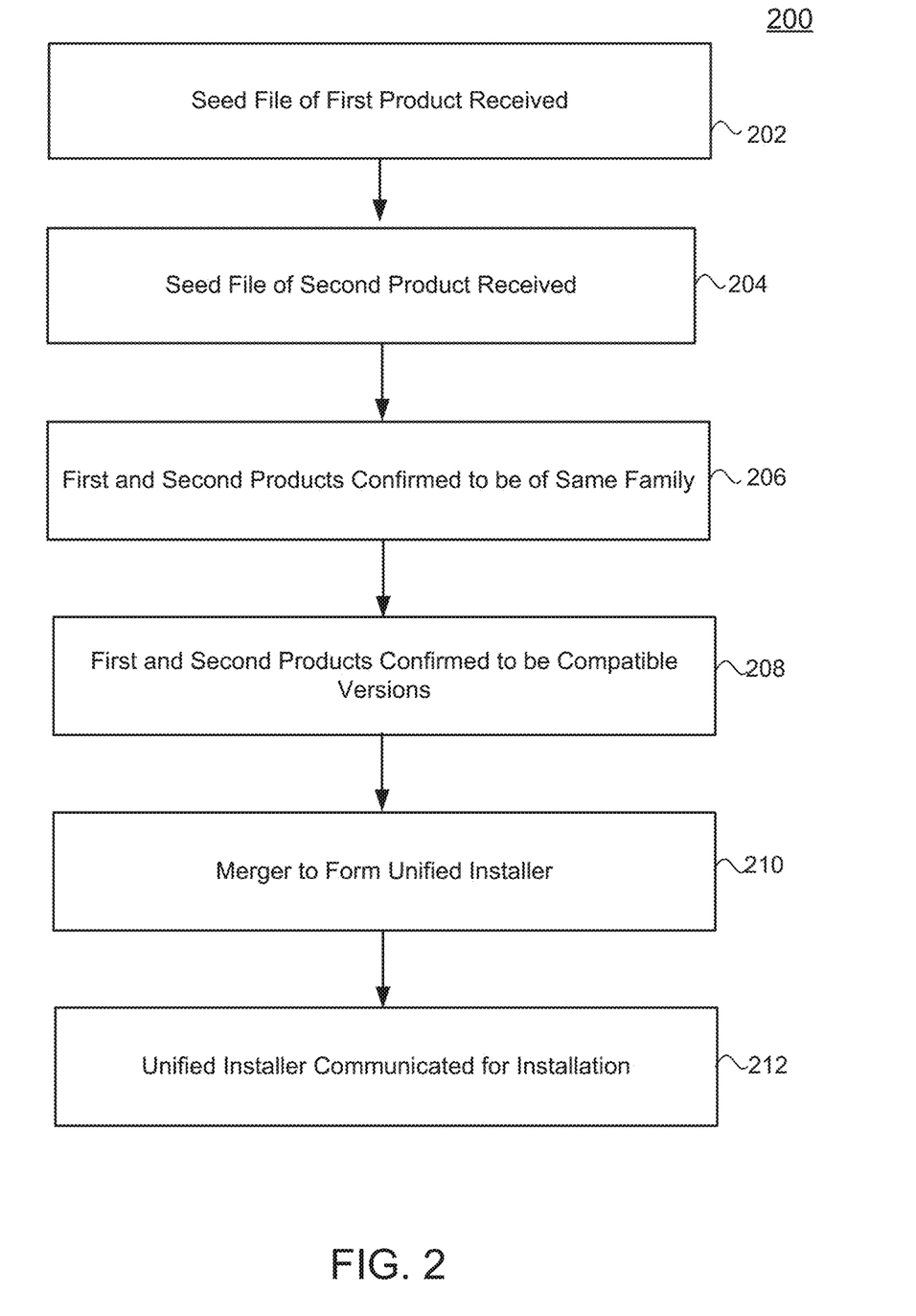
FIG. 2 shows a simplified diagram of a method according to an embodiment.

FIG. 2 is a flow diagram showing an overview of various actions taken in a method 200 according to an embodiment. At 202, a seed file of a first product is received. At 204, a seed file of a second product is received.

At 206, the first and the second products are confirmed to be of a same product family. At 208, the versions of the first and the second products are confirmed to be compatible.

At 210, the first and second product are merged to create a unified installer according to embodiments. As described herein, this merger may comprise a logical merger followed by a physical merger.

At 212, the unified installer is communicated to an installation procedure for installation.

Embodiments may offer certain benefits over conventional approaches. For example, certain embodiments may conserve processing resources. That is, installation of multiple copies of elements shared by more than one product, is avoided.

Moreover, other resources may also be conserved. That is, storage resources are utilized efficiently by avoiding storage of multiple copies of a same element common between compatible versions of products of a same product family.

Further details regarding specific embodiments, are now provided in connection with a particular example utilizing the Business Intelligence (BI) family of products available from SAP SE of Walldorf, Germany.

EXAMPLE

Enterprise-based software may have several add-ons, which belong to same family Membership to the same family indicates that the software installation happens with same backend procedure (setup-engine). However, one or more of the following factors may differ as between the main product and various add-ons.

Configuration file. There may be multiple files where several configuration parameters are written.

Deployment units (DU). This factor reflects grouping of the dependent internal software in a modular way. Internal software can be third party dependent software, or it can be proprietary software. More specifically, a DU carries a set of files, with actions to direct the files to place in proper location with necessary rights, along with instructions to write in registry and few necessary commands to execute.

Thus, a complex enterprise-based software may be the sum of all of the Deployment Units. One Deployment Unit (e.g., DU A) can reference another Deployment Unit (e.g., DU B). This indicates that DU A is dependent of DU B. Accordingly, before DU A is installed, DU B needs to be installed. This modular grouping of units helps in parallel and distributed development of software products.

Prerequisite List. This factor is based upon software having lists of prerequisites. This factor decides upon those pre-dependent software/configuration/actions that are required before installing the software.

Feature List. This is a list of features and its subtree belongs to each software component.

Property. Each software component has some list of properties. These may be similar to a key-value pair.

Product Seed. A DU can refer to one or more other DUs. So, there are few DUs which lie at the head of the DU reference chain. Such a head DU is referred to as a DU seed. The product seed file defines which of all DU seeds, need to consider based-on features. So, based on the features selected, setup-engine will install those DU(s) and their dependent referenced DUs.

Every product has a product-seed file. And, every Deployment unit will have one seed file.

Product Sequence. This factor defines the sequence of screens need to display for a product.

Figure 3:
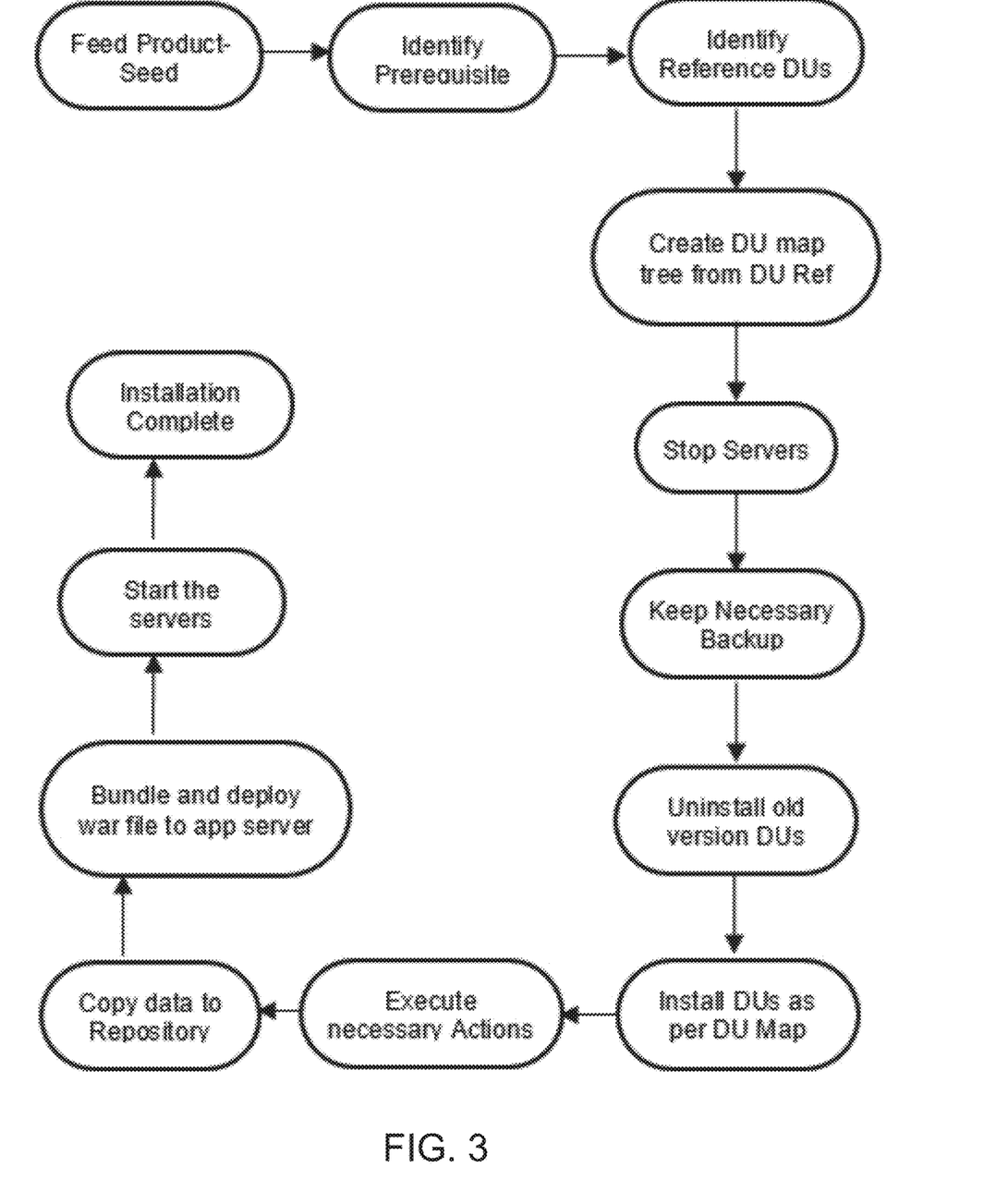
FIG. 3 shows a simplified diagram of a software installation process.

Segregating the installation steps of a product update at a high level, results in the process flow of FIG. 3.

A unified installer according to embodiments seeks to merge two or more products of same family together at the runtime. As an initial case, the following indicates the result of simply merging two products of a same family, and installing.

As threshold matter, it is noted that the setup-engine will execute only once (rather than two times).

Configuration file. Several configurations may be common for both of the products. So, the union of configurations of both the products would be less than or equal to sum of configurations of the two products. This is similarly true for:

Prerequisite list,

Feature list,

Property.

Regarding actions taken, a few common operations will be executed only once. Examples include deploying a war file in an application server, and the restarting of servers.

Deployment Units. Several DUs may be common between both the products. So, merging all the DUs will be less than or equal to sum of DUs of both the product. In that case, Installing or processing of duplicates DUs time will get saved.

Product Seed. There may be common features or common DUs. So there is probability that the merged product seed may be lesser in size as compared to the sum of two product seed files.

Product Sequence: There may be common screens. In this case also, embodiments are afforded the benefit of time to process. Another way, in general add-on install screens are a subset of the main enterprise solution. So, in that case, the add-on product sequence file may be ignored. However, if extra entries are present in the add-on, both of the files can be merged intelligently.

From analysis of the above factors, some benefit in installation time will accrue if the products can be merged and installed at one time.

Accordingly, embodiments relate to a tool which allows the user to select multiple products of same family, for installation in a single event. Initially, this tool can identify if the products are from same family.

If the products are from the same family, the tool can intelligently merge the various:

Configuration files,
Deployment Units,
Product Seed, and
Product Sequences, of the members of the product family accordingly, as per xml/j son/key-value format.

Then, the tool will fire the installation as single unified installer merging all the products.

Summarizing, embodiments may perform two different sets of mergers. A first merging involves the logical merging of configuration, seed and sequence files. A second merging involves physical merging of all DUs.

Details regarding the first, logical merging of files according to this example, are now provided. This first merger involves analyzing the configuration, seed, and sequence files for the differences. A procedure is composed for merging the files logically to a single file for a separate unified product—which is the merger of the separate individual products (belong to the same family).

Figure 4:
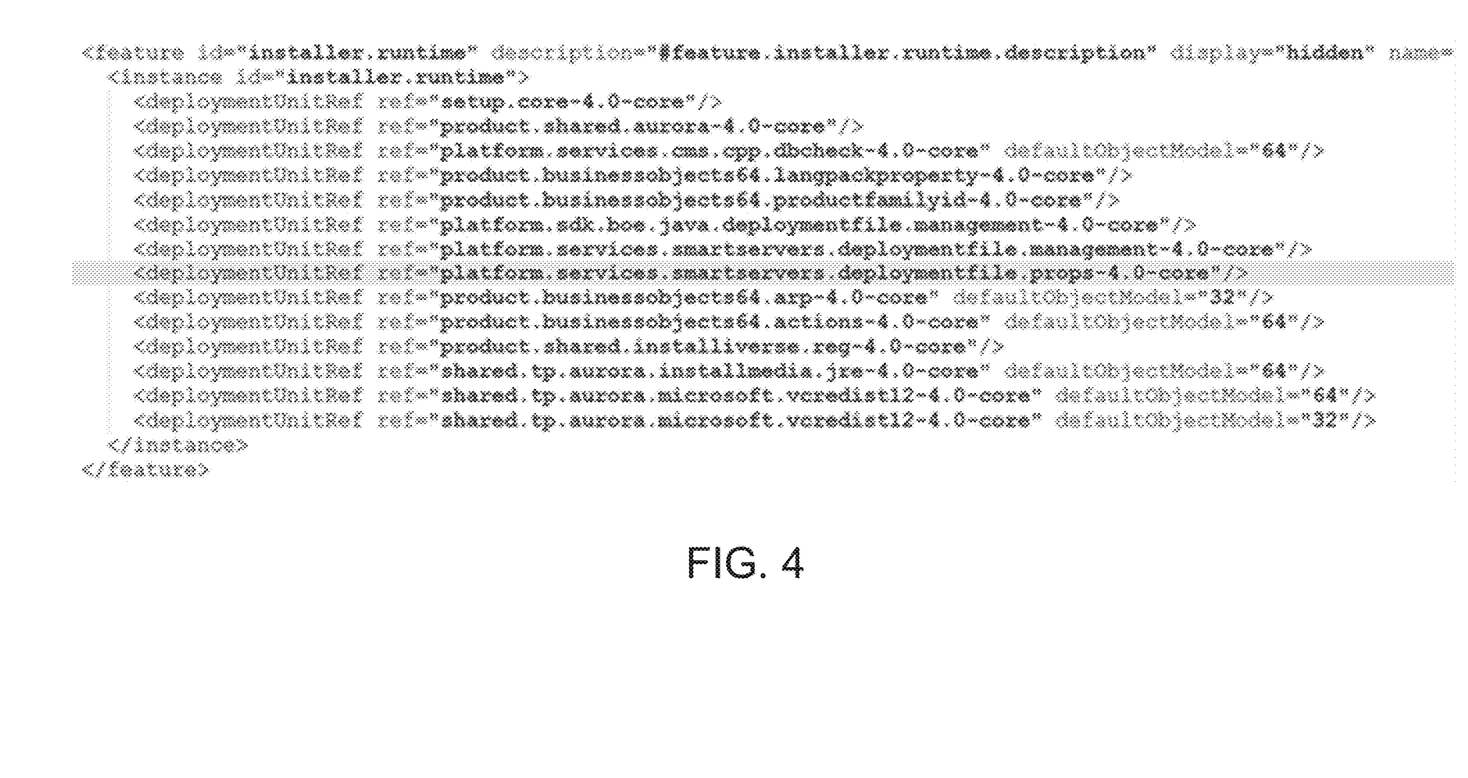
FIG. 4 shows code for a product-seed of a first product to be installed according to an example.
Figure 5:
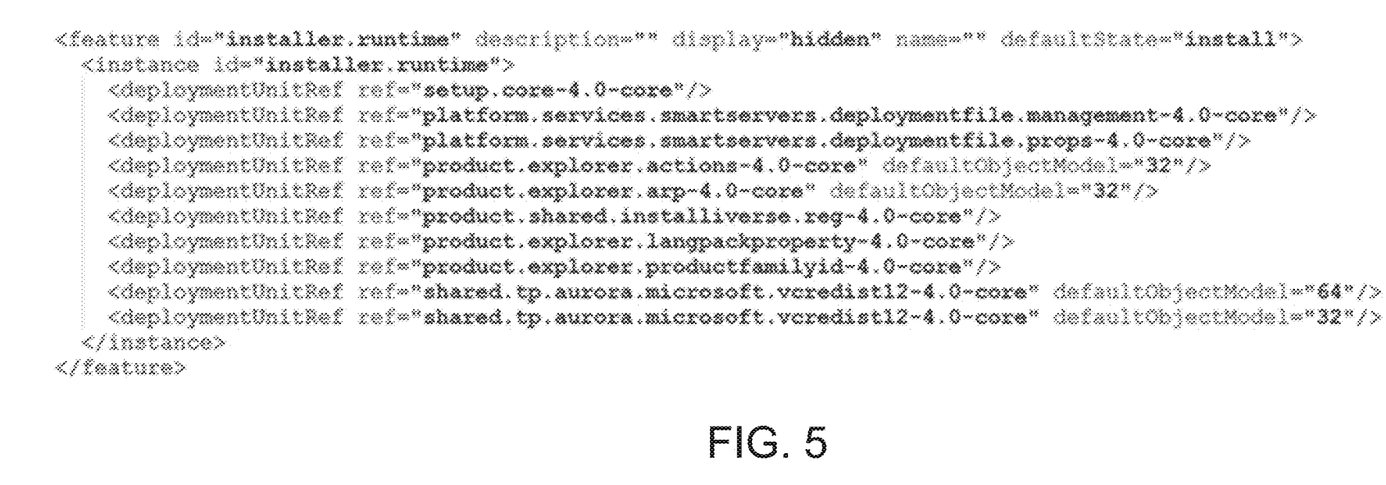
FIG. 5 shows code for a product-seed of a second product to be installed according to the example.
Figure 6:
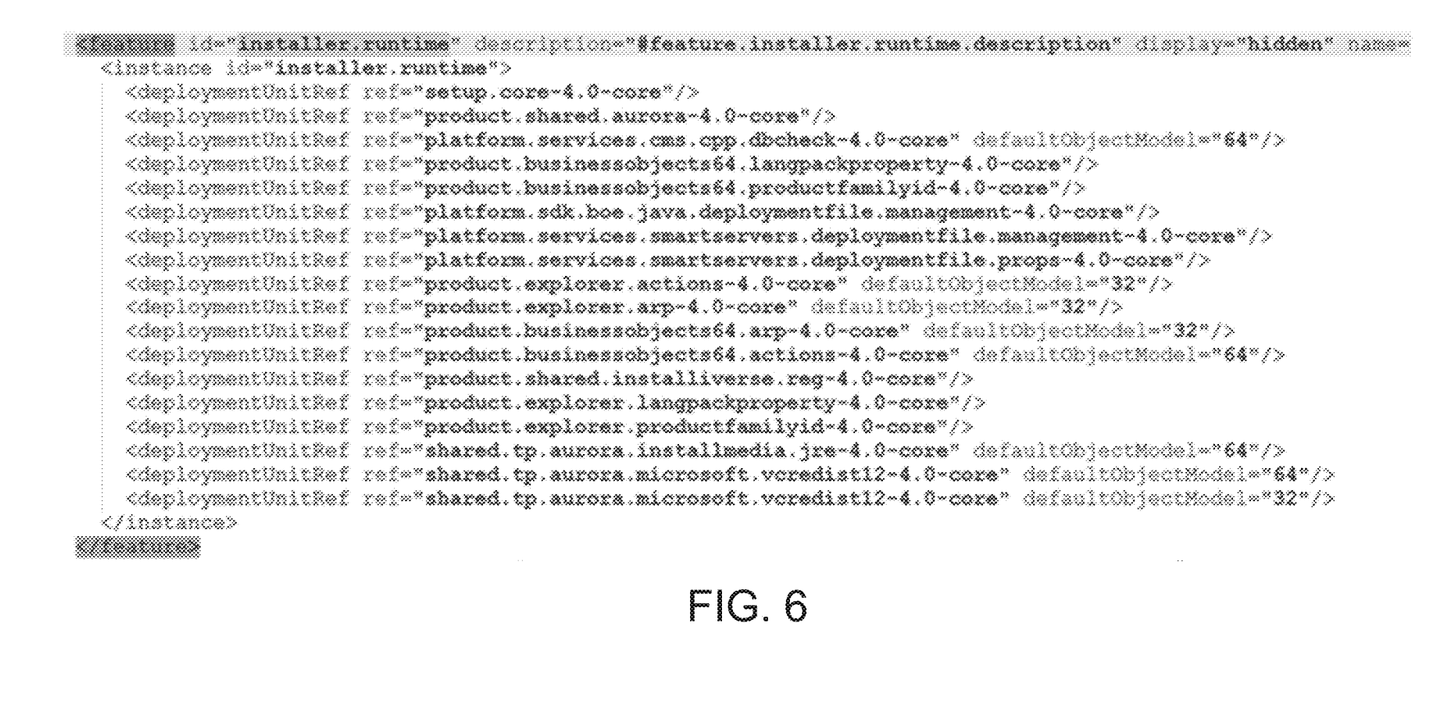
FIG. 6 shows code for a merged product-seed of a unified installer according to the example.

The code excerpts shown in FIGS. 4-6, illustrate how this first merger is occurring. FIG. 4 is a code snippet of a product-seed file of a first product. This shows for the feature "installer.runtime", the DU references required.

FIG. 5 is a code snippet of a product-seed file of a second product belonging to the same product family as the first product of FIG. 4. FIG. 5 shows the list of DU references for the "installer.runtime" feature.

Contrasting FIGS. 4 and 5, reveals FIG. 4 to have four extra DU references (compare to FIG. 5 for the feature "installer.runtime"). According to this example, these four extra DU references are all named with product.explorer.*

Merging the product-seed files of the first and second products, produces the code excerpt of FIG. 6 for the merged product-seed file of the unified installer. It is seen that FIG. 6 is the union of all the Deployment Unit references for both the first and second products considering the feature "installer.runtime".

Logic is referenced to merge the features and create the new product seed for the unified installer. Similarly, embodiments can logically merge other configuration files, seed files, and sequence files.

In drafting logic to merge any of the above factors of multiple products, some parameters may conflict. Depending upon the conflicting parameter type, embodiments may need to analyze and compose intelligent logic in order to consider the value of the parameter in the merged product.

Details regarding the second, physical merging of DUs according to this example, are now provided. The products have their own set of DUs.

Out of those DU sets, relatively few individual DUs may be common between the merged products. This example focuses on copying all the DU together, to behave as DUs of a separate product merge of all of them.

For purposes of illustrating this second merger, consider the following.

Product "A" has five DUs {a, b, c, d, e}.
Product "B" has five DUs {c, e, k, m, n}.
Product "C" has five DUs {e, f, n, y, z}.

Accordingly, a merged product will have all of these DUs {a, b, c, d, e, f, k, m, n, y, z}.

An analytical model according to this specific example is now discussed. In particular, the SAP Business Intelligent family of products was used. Server downtime was only required at the time of software update. Merging of products (in terms of files, DUs) at runtime does not involve downtime, as that process is creating another product from the merger of all of the products. Downtime is only applicable when the newly merged product is getting installed.

The entire installation time is segregated into the following:

p=Processing of DUs to install,
a=Execution of setup engine core procedure,
s=server stop and start,
w=War file packaging and deploying for application servers,
r=Copying necessary contents to repository.

Then, the total installation time taken by three individual products is:

$$\text{Product ``}A\text{''}=p_1+a_1++w_1+r_1$$

$$\text{Product ``}B\text{''}=p_2+a_2+s_2+w_2+r_2$$

$$\text{Product ``}C\text{''}=p_3+a_3+s_3+w_3+r_3$$

Now, after merging the three products, comparing the time taken by the unified installer:

Merged Product=$p_u+a_u+s_u+w_u+r_u$.

Analysis reveals the following A.-E.

A. As, number of DUs in the merged product is less than or equal to the sum of numbers of DUs of individual products, $$p_u<=p_1+p_2+p_3.$$

B. As the setup engine core procedure is running only once (instead of multiple times for the number of products), $$a_u<a_1+a_2+a_3.$$

C. All the servers will get only restarted once, instead for each of the multiple number of products, $$s_u<s_1+s_2+s_3.$$

D. War file packaging and deployment will also happen once, $$w_u<=w_1+w_2+w_3.$$

E. Copying content to the repository will also happens once. This is an Input/Output (JO) operation, and will also save time.

$$r_u<=r_1+r_2+r_3.$$

From the above logic, it is demonstrated that: "Time taken for Unified Installer installation is less than the sum of time taken by the individual products installation."

Experimental results according to the example, are now discussed. In particular, above it is demonstrated that the merged product of a unified installer according to embodiments, has reduced time consumption than installation of an individual product installation one after another.

Figure 7:
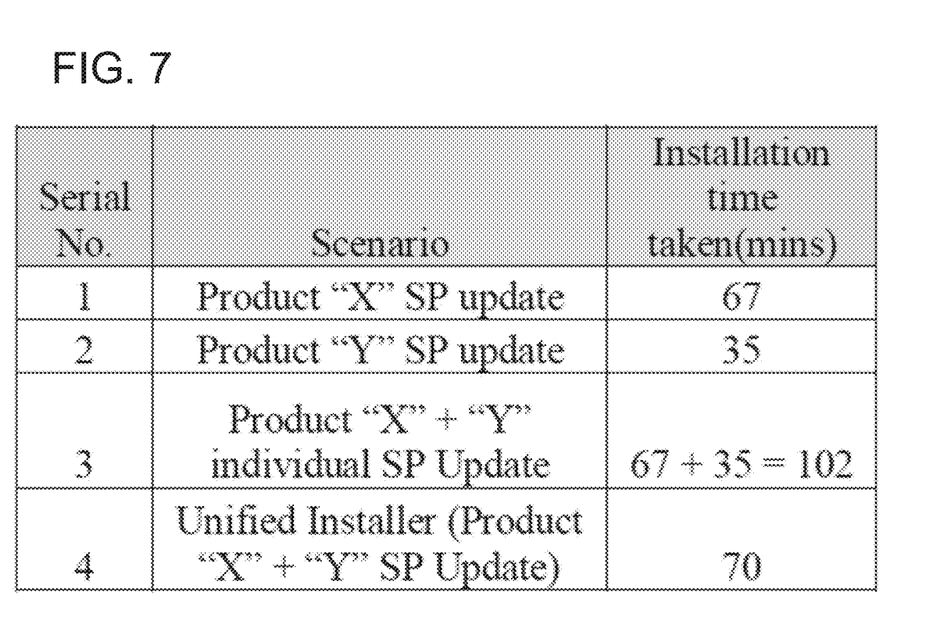
FIG. 7 is a table showing installation statistics for one use case.

With practical implementation of unified installer considering SAP BI products, this example assumes:
Product "X"=SAP Business Object (BOE)
Product "Y"=SAP Business Object Explorer
Product "Z"=SAP Business Object BI client Considering the Products "X" and "Y", observed statistics are listed in the table of FIG. 7. That figure shows an improvement of about 31% in installation time.

Figure 8:
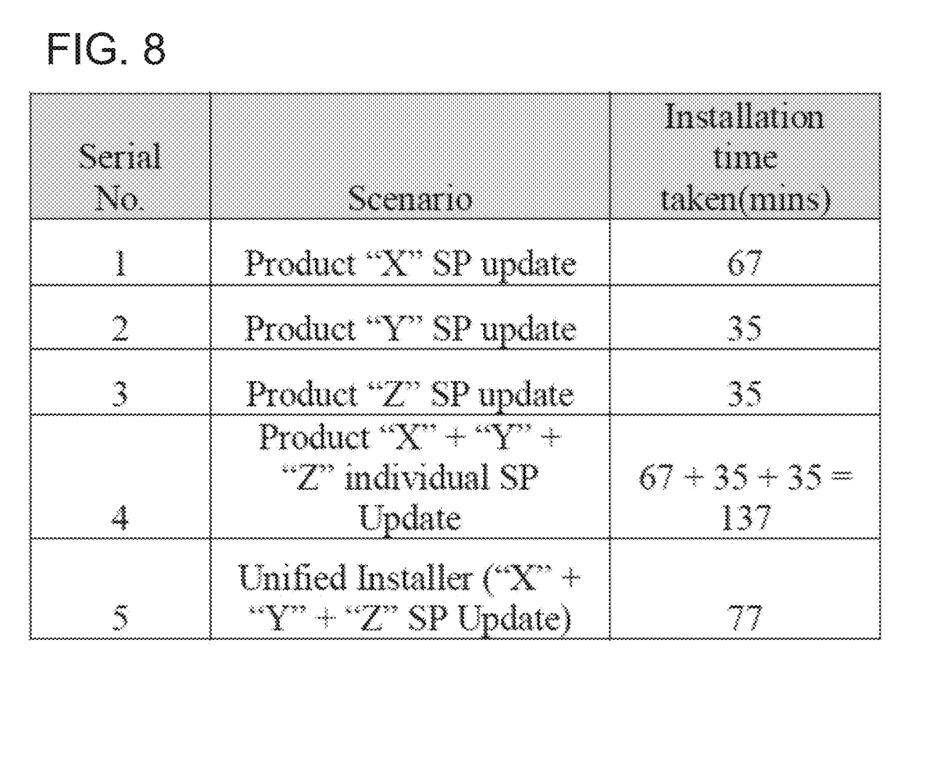
FIG. 8 is a table showing installation statistics for another use case.

Considering the Products "X", "Y", and "Z", observed statistics are listed in the table of FIG. 8. That figure shows an improvement of about 43% in installation time.

The result of improvement varies based on the number of common factors, the size of the products, and the number of products that are unified. As seen in the above results in FIGS. 7-8, significant improvement in reduced software downtime can be achieved.

Embodiments may offer benefits over alternative approaches. For example, one alternative approach could be to merge different possible combinations of products, providing that to the customer as a single package. However, a large number of such combinations could exist, and is difficult for any software vendor to maintain all of the packages generated and provide support for each of them.

By contrast, embodiments as described herein focus on merging of software products at runtime. This makes it possible to provide customers an option of combining the products belonging to a same family at their own choice.

Returning to FIG. 1, there the particular embodiment depicted with the engine responsible for providing the unified installer being located outside of the database. However, this is not required.

Rather, alternative embodiments could leverage the processing power of an in-memory database engine (e.g., the in-memory database engine of the HANA in-memory database available from SAP SE), in order to perform various functions.

Figure 9:
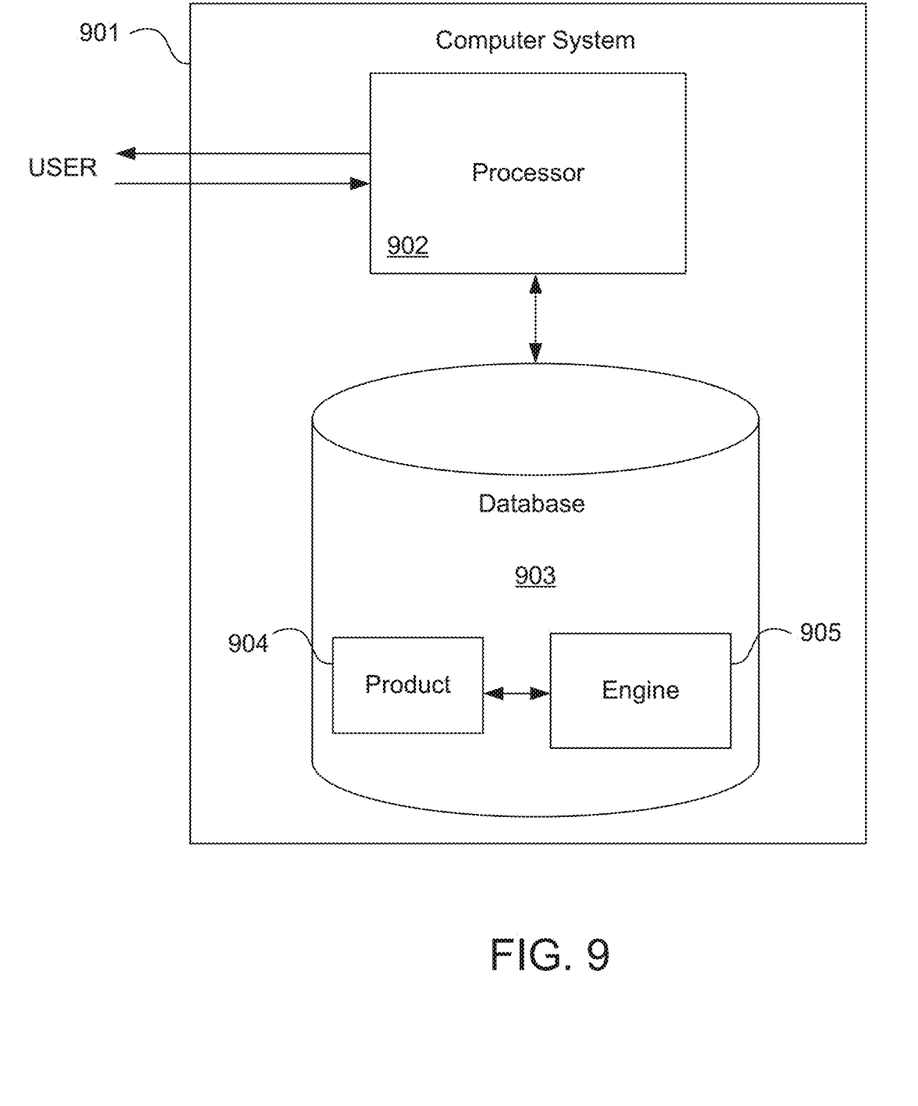
FIG. 9 illustrates hardware of a special purpose computing machine according to an embodiment that is configured to implement installation of software products.

Thus FIG. 9 illustrates hardware of a special purpose computing machine configured to implement software product installation according to an embodiment. In particular, computer system 901 comprises a processor 902 that is in electronic communication with a non-transitory computer-readable storage medium comprising a database 903. This computer-readable storage medium has stored thereon code 905 corresponding to an engine. Code 904 corresponds to a stored product (including its Deployment Units). Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 10:
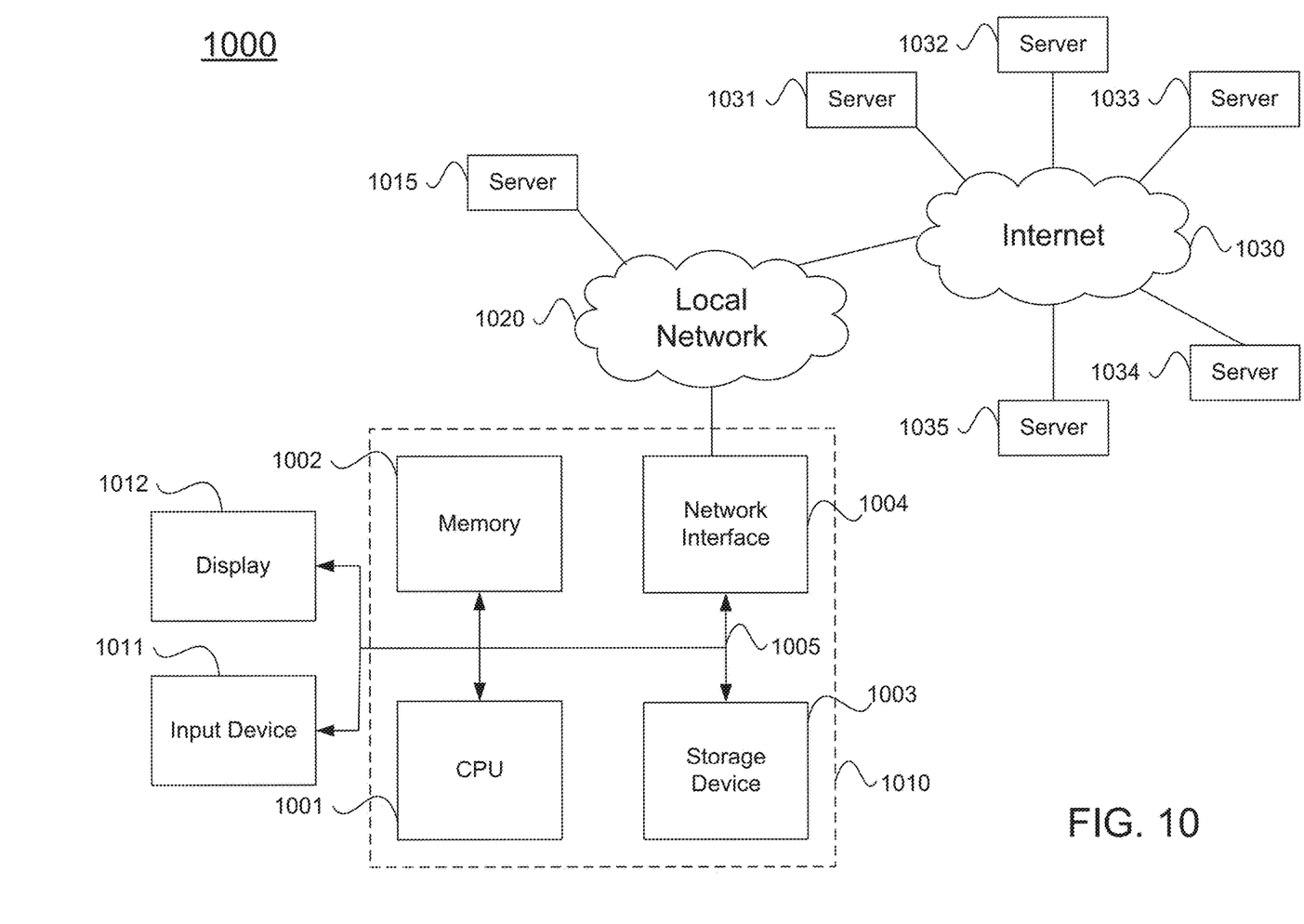
FIG. 10 illustrates an example computer system.

An example computer system 1000 is illustrated in FIG. 10. Computer system 1010 includes a bus 1005 or other communication mechanism for communicating information, and a processor 1001 coupled with bus 1005 for processing information. Computer system 1010 also includes a memory 1002 coupled to bus 1005 for storing information and instructions to be executed by processor 1001, including information and instructions for performing the techniques described above, for example. This memory may also be used for storing variables or other intermediate information during execution of instructions to be executed by processor 1001. Possible implementations of this memory may be, but are not limited to, random access memory (RAM), read only memory (ROM), or both. A storage device 1003 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1003 may include source code, binary code, or software files for performing the techniques above, for example. Storage device and memory are both examples of computer readable mediums.

Computer system 1010 may be coupled via bus 1005 to a display 1012, such as a cathode ray tube (CRT) or liquid crystal display (LCD), for displaying information to a computer user. An input device 1011 such as a keyboard and/or mouse is coupled to bus 1005 for communicating information and command selections from the user to processor 1001. The combination of these components allows the user to communicate with the system. In some systems, bus 1005 may be divided into multiple specialized buses.

Computer system 1010 also includes a network interface 1004 coupled with bus 1005. Network interface 1004 may provide two-way data communication between computer system 1010 and the local network 1020. The network interface 1004 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 1010 can send and receive information, including messages or other interface actions, through the network interface 1004 across a local network 1020, an Intranet, or the Internet 1030. For a local network, computer system 1010 may communicate with a plurality of other computer machines, such as server 1015. Accordingly, computer system 1010 and server computer systems represented by server 1015 may form a cloud computing network, which may be programmed with processes described herein. In the Internet example, software components or services may reside on multiple different computer systems 1010 or servers 1031-1035 across the network. The processes described above may be implemented on one or more servers, for example. A server 1031 may transmit actions or messages from one component, through Internet 1030, local network 520, and network interface 1004 to a component on computer system 1010. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
receiving, from a storage layer, a first software product including a first seed file specifying a deployment unit;
receiving, from the storage layer, a second software product including a second seed file also specifying the deployment unit;
merging, by a processor, the first software product and the second software product according to the first seed file and the second seed file to create a unified installer, the unified installer including a single instance of the deployment unit, wherein said merging comprises removing one or more redundant seed files between the first software product and the second software product, where the merging comprises:
determining from the first seed file and the second seed file that the first software product and the second software product belong to a same product family and a version of the first software product is compatible with a version of the second software product,
performing a first merging of the first seed file and the second seed file to create a merged seed file,
referencing the merged seed file to perform a second merging that considers a hierarchical structure of product components to create the unified installer including the single instance of deployment unit such that merging of all deployment units,
wherein the merged first and second software product of the unified installer has reduced time consumption from a reduced number of deployment units and the unified installer is passed to an installation procedure that installs the deployment units only once; and
forwarding, by the processor, the unified installer to a client to install the first software product and the second software product by running the single instance of the deployment unit.

2. A method as in claim 1 wherein the merging further considers a prerequisite.

3. A method as in claim 1 wherein the merging further considers a property.

4. A method as in claim 1 wherein:
the first software product is stored in an in-memory database; and
the merging is performed by an in-memory database engine of the in-memory database.

5. A non-transitory computer readable storage medium embodying a computer program, when executed by a processor of a computer system cause the processor to:
receiving, from a storage layer, a first software product including a first seed file specifying a deployment unit;
receiving, from the storage layer, a second software product including a second seed file also specifying the deployment unit;
merging the first software product and the second software product according to the first seed file and the second seed file to create a unified installer, the unified installer including a single instance of the deployment unit, wherein said merging comprises removing one or more redundant seed files between the first software product and the second software product, where the merging comprises:
determining from the first seed file and the second seed file that the first software product and the second software product belong to a same product family and a version of the first software product is compatible with a version of the second software product,
performing a first merging of the first seed file and the second seed file to create a merged seed file,
referencing the merged seed file to perform a second merging that considers a hierarchical structure of product components to create the unified installer including the single instance of deployment unit such that merging of all deployment units,
wherein the merged first and second software product of the unified installer has reduced time consumption from a reduced number of deployment units and the unified installer is passed to an installation procedure that installs the deployment units only once; and
forwarding the unified installer to a client to install the first software product and the second software product by running the single instance of the deployment unit.

6. A non-transitory computer readable storage medium as in claim 5 wherein the merging further considers a prerequisite.

7. A non-transitory computer readable storage medium as in claim 5 wherein the merging further considers a property.

8. A non-transitory computer readable storage medium as in claim 5 wherein:
the first software product is stored in an in-memory database; and
the merging is performed by an in-memory database engine of the in-memory database.

9. A computer system comprising:
one or more processors;
a software program, executable on said computer system, the software program configured to cause an in-memory database engine of an in-memory source database to:
receive from the in-memory database, a first software product including a first seed file specifying a deployment unit;
receive, from the in-memory database, a second software product including a second seed file also specifying the deployment unit;
merge the first software product and the second software product according to the first seed file and the second seed file to create a unified installer, the unified installer including a single instance of the deployment unit, wherein said merging comprises removing one or more redundant seed files between the first software product and the second software product, where the merging comprises:
determining from the first seed file and the second seed file that the first software product and the second software product belong to a same product family and a version of the first software product is compatible with a version of the second software product,
performing a first merging of the first seed file and the second seed file to create a merged seed file,
referencing the merged seed file to perform a second merging that considers a hierarchical structure of product components to create the unified installer including the single instance of deployment unit such that merging of all deployment units,
wherein the merged first and second software product of the unified installer has reduced time consumption from a reduced number of deployment units and the installer is passed to an installation procedure that installs the deployment units only once; and forward the unified installer to a client to install the first software product and the second software product by running the single instance of the deployment unit.

10. A computer system as in claim 9 further comprising the in-memory database engine considering a prerequisite in performing the merge.

11. A computer system as in claim 9 further comprising the in-memory database engine considering a property in performing the merge.

* * * * *